C. G. DICKINSON.
Harvester.
No. 22,786.
Patented Feb. 1, 1859.
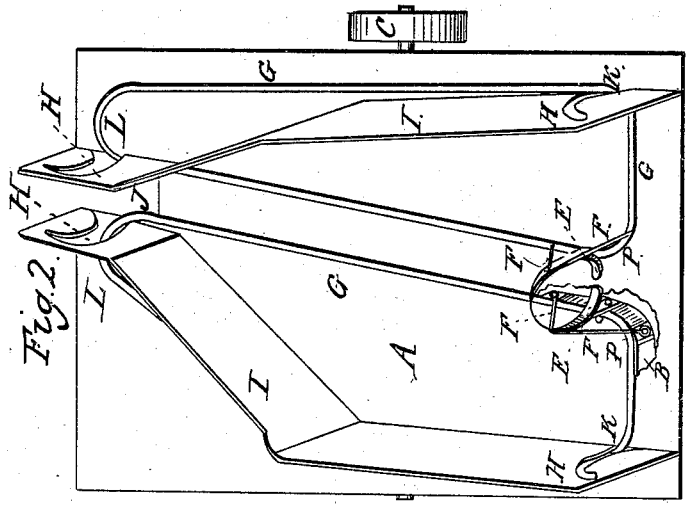
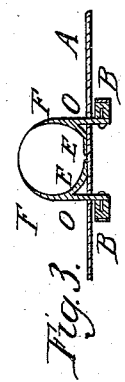
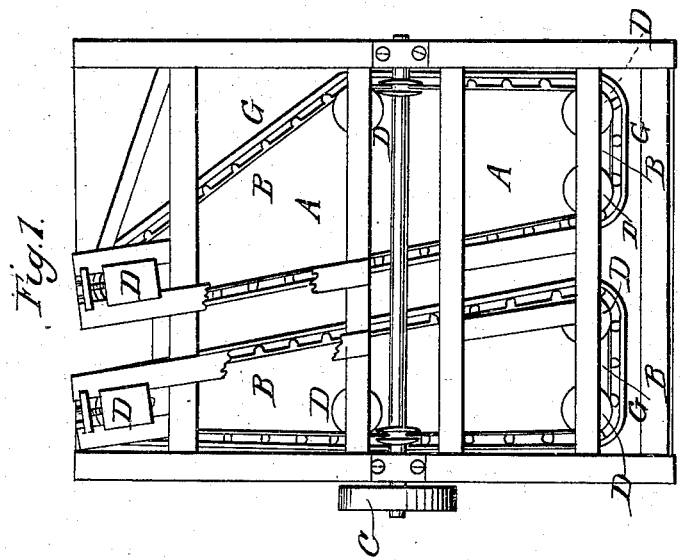
Witnesses
H. D. Myers
H. W. Moyers
Inventor
Charles G. Dickinson

UNITED STATES PATENT OFFICE.

C. G. DICKINSON, OF POUGHKEEPSIE, NEW YORK.

IMPROVEMENT IN HARVESTERS.

Specification forming part of Letters Patent No. 22,786, dated February 1, 1859.

*To all whom it may concern:*

Be it known that I, CHARLES G. DICKINSON, of the city of Poughkeepsie, county of Dutchess, State of New York, have invented a new and useful Improvement in the Raking Attachment to a Harvester; and I do hereby declare that the following is a full, clear, and exact description of the construction and operation of the same, reference being had to the annexed drawings, making part of this specification in which—

Figure 1 is an inverted plan. Fig. 2 is a perspective view of a platform of a harvester showing my improvements; and Fig. 3 is an elevation, showing the position of the arms and their attachment to the endless chain or belt, and also the curved foot attached to each arm when the gavel has been compressed ready to move off to delivery.

To enable others skilled in the art to make and use my invention, I will proceed to describe its construction and operation.

A in the drawings represents the platform, with the side or curb I, Fig. 2, standing perpendicular to the platform, said sides having a semi-elliptical opening, H, Fig. 2, near each end of each side, the said sides standing nearly parallel with the outer edge of the platform for about one-half the length of the platform, and then converging (but not at the same angle) to an opening, J, Fig. 2, in the rear end of the platform, sufficient to allow the passage of a gavel between the sides and through the platform.

In the platform are made two slots, G, Fig. 2, outside of the curb of the platform, and extending from the rear of the same to near the front thereof, where the slots curve at K, Fig. 2, then extend through the curb, then along the front to near the center of the platform, leaving a space between the slots sufficient for a gavel, where they curve again at P, Fig. 2, and extend (leaving gavel-space between) parallel with each other, diagonally from front to rear of platform, where they curve again at L, Fig. 2—one to the right and the other to the left—through the curb to outside of same, each forming a continuous slot separate from the other.

On the under side of the platform I have two endless chains or belts, B, Fig. 1, to be moved by power from a harvester by a pulley on either side, C, Figs. 1 and 2, attached to shaft C, Fig. 1. To this endless chain or belts are attached and passing through the slots two upright arms, O, Figs. 2 and 3, curved at the top, so as to meet at the top when the gavel is compressed, the said arms being designed to gather and compress the gavel and carry the same to delivery. Iron braces or compressors F, Fig. 2, with an eye in the top of each, are attached to the endless chain or belt fore and aft of each upright arm, and pass up through the slots, and are connected by the eye to the arms near the top. These braces or compressors are designed to brace the arms, and also to aid in gathering and compressing the gavel and holding the same while passing to the delivery.

On the inside of each arm is a flat curved bar or foot, E, Figs. 2 and 3, attached to the arms, and so curved as to pass close to the deck of the platform and under the cut grain, nearly meeting under the gavel, when the same is compressed, ready to be carried off to delivery. The belts B, Fig. 1, are passed directly under the slots G, Fig. 2, and by passing around small pulleys D, Fig. 1, are made to follow the slots and carry the arms through the slots, these chains or belts being so arranged as to move the arms to the position for compressing the grain at the same time and place, and to open the same at the time and place, when necessary, to deliver the gavel at the opening or delivery J, Fig. 2.

I attach the platform to a harvester and obtain power from harvester driving-pulley. The harvester and platform moving together, the grain, as cut, falls upon the front of the platform across the slots G, Fig. 2. The upright arms O, Figs. 2 and 3, are moved by the endless chains or belts through the slots outside of the curb toward the fore end of the platform, where they turn at K, Fig. 2, pass through the openings H, Fig. 2, and, moving toward each other along the front of the platform, commence gathering and compressing the grain lying and still falling across the slots, and having arrived at curves P, Fig. 2, turn, bringing the arms in the position as indicated by Fig. 3, and, having compressed the gavel, the arms pass on, following the diagonal slots from front to rear of platform, and, having arrived at the opening J, Fig. 2, the arms pass around the curves L, Fig. 2, through the opening H, Fig. 2, the arms opening at this point and allowing the gavel to drop through the opening J, Fig. 2, upon the ground, clear of the track of the harvester, the arms then passing on again to perform the same operation as, before.

I do not claim the slots; neither the endless chains or belts.

What I claim as my invention, and desire to secure by Letters Patent, is—

The combination of the curved arms O, curved feet E, and braces or compressors F, with the endless belts or chains B, when arranged with relation to each other and to the platform A, and operating together in the manner described, for the purpose specified.

CHARLES G. DICKINSON.

Witnesses:
H. D. MYERS,
H. W. MYERS.